July 19, 1938.  W. J. MILLER  2,124,204
METHOD AND APPARATUS FOR MANUFACTURING POTTERY WARE
Filed May 29, 1936  2 Sheets-Sheet 1
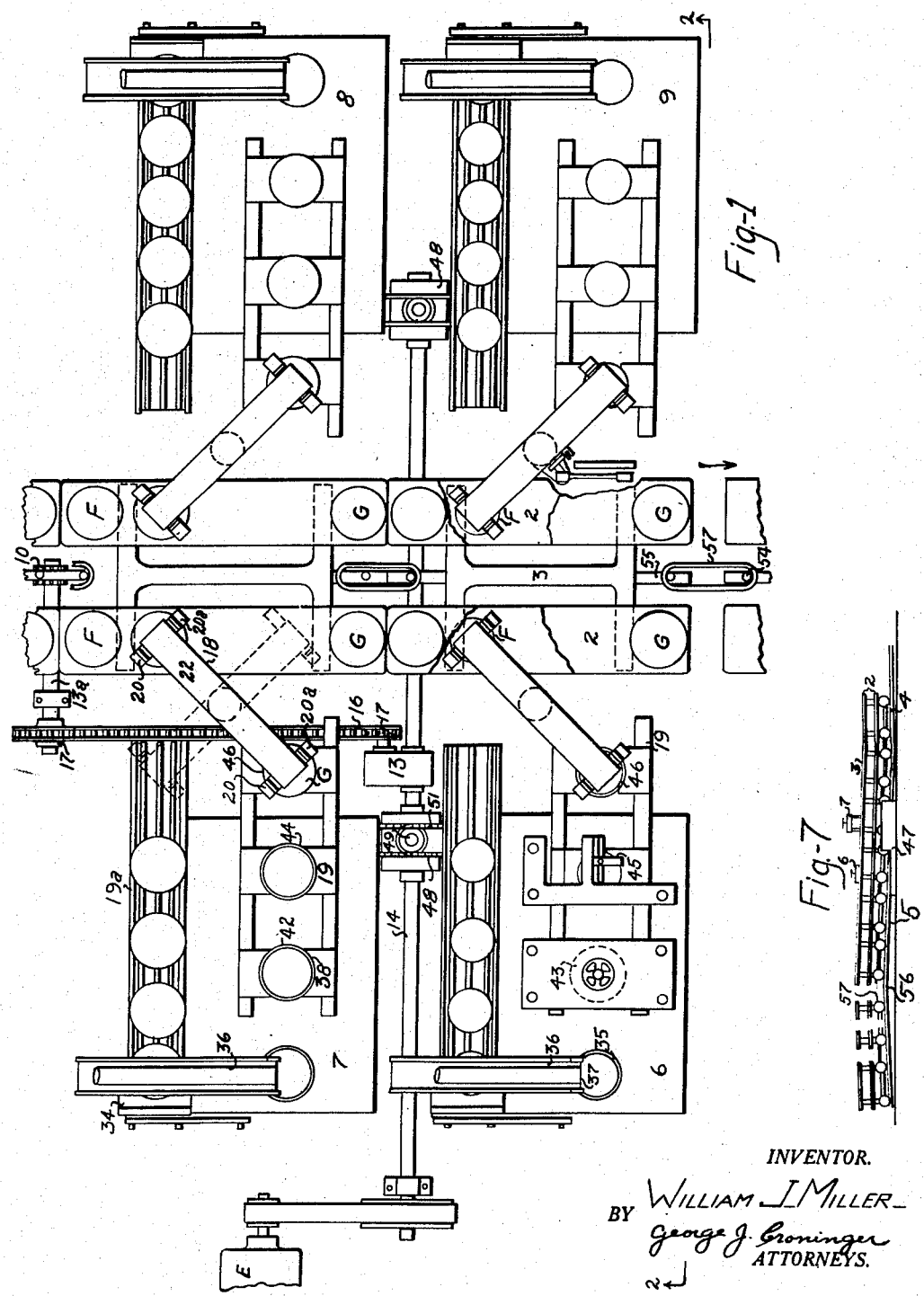
INVENTOR.
BY *William J. Miller*
*George J. Groninger*
ATTORNEYS.

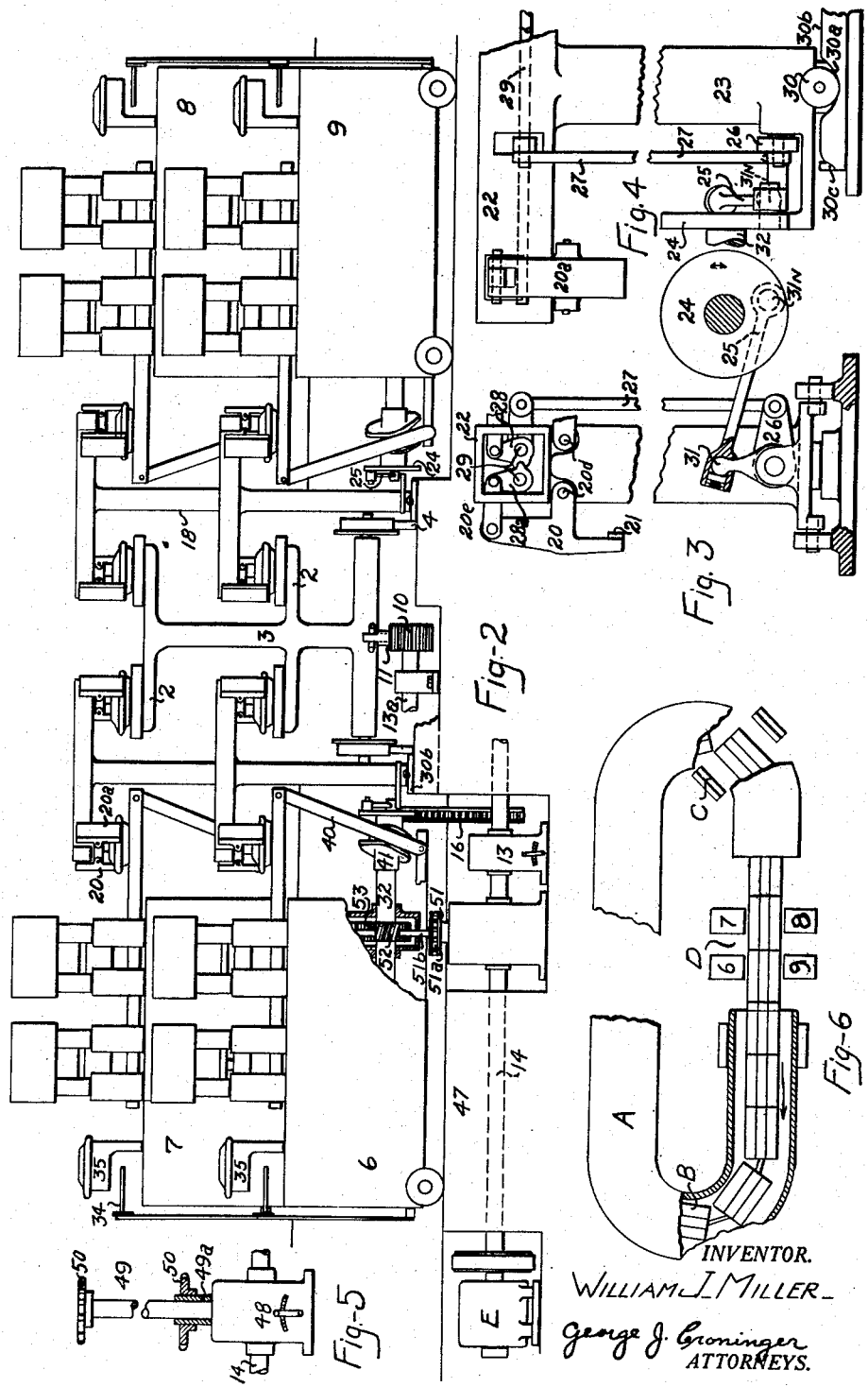

Patented July 19, 1938

2,124,204

UNITED STATES PATENT OFFICE 2,124,204

METHOD AND APPARATUS FOR MANUFACTURING POTTERY WARE

William J. Miller, Swissvale, Pa.

Application May 29, 1936, Serial No. 82,440

21 Claims. (Cl. 25—2)

This invention relates to methods and apparatus for the manufacture of pottery ware, particularly the class known as dinnerware such as plates, cups, saucers, etc. It has to do with a system and installation for the mass, line production of ware on absorbent molds automatically from clay mass to dried, green product ready for the finishers.

The present application is a continuation as to all divisible subject matter of my co-pending applications for United States Letters Patent Serial No. 5,795 relating to an automatic fabricating machine and Serial No. 25,701 relating to an automatic fabricating machine and mold travelling and transferring apparatus.

The objects of the present invention are: to provide an installation and method for the manufacture of diversified pottery ware shapes on a mass production scale but with a plurality of individual jiggering machines which are operated in conjunction with a dryer conveyor and between which the molds are automatically transferred; to travel molds in repeated cycles in endless production lines through a battery of fabricating machines, a dryer and ware stripping station, the molds remaining in their respective lines throughout repeated cycles; to combine in a unitary installation a plurality of automatic jiggering machines with an articulated mold conveyor having multiple tiered mold supports; to travel molds in substantially horizontal endless paths throughout the production cycle and in the same lines to present the molds for fabrication in continuous uninterrupted spaced relation moving in a substantially common plane as respects the molds in any one line; to enable production speeds in all lines commensurate with the speed with which the particular article undergoing fabrication may be jiggered, as limited only by the speed of the conveyor; to enable uninterrupted travel of the conveyor through any number of repeated cycles; to increase mold productivity; to eliminate the manual transportation of molds between a machine and dryer and to eliminate manual intervention in the production line.

According to my invention, the molds are arranged in spaced groups on a conveyor comprising a multiple of individual units connected together for the directional travel thereof, each unit having tiered mold supporting shelves in longitudinal alinement; the cars are circulated in close-up relation adjacent a battery of fabricating machines operating at different levels and arranged on each side of the conveyor, the molds being automatically transferred to the machines from their respective lines for filling and when filled, automatically replaced in their respective lines on the conveyor which operates with uninterrupted progress in its advance although the fabricating machines may operate at different speeds relative to one another according to the size and shape of the ware being produced on any one machine; after the cars pass the fabricating station, the molds with freshly formed and undried ware thereon advance to and through a tunnel type dryer, the mold cars proceeding through an undulating path therethrough in separated relation and after a predetermined drying interval in an atmosphere of controlled temperature and humidity, the cars are travelled past a stripping station where the ware is removed and stacked for subsequent transfer to the finishers, the molds continuing in their respective lines and on the cars back to the fabricating station where the cars again move into close-up relationship and proceed steadily past the fabricating machine whilst the molds in all lines undergo refilling.

In the drawings, Fig. 1 is a top plan view of the fabricating zone showing the preferred form of jiggering machines, the conveyor and the mold transferring apparatus.

Fig. 2 is an elevation taken in the direction of the arrows 2—2 in Fig. 1 with certain of the parts in section.

Fig. 3 is an elevation of the mold transferring apparatus with certain of the parts in section and Fig. 4 is a side elevation of the apparatus of Fig. 3.

Fig. 5 is a detail partly in section of a speed reducer.

Fig. 6 is a top plan view of a complete installation with the dryer broken out in certain zones for illustrative purposes.

Fig. 7 is a side elevation of the jiggering zone with the fabricating machines on the rear side removed disclosing the inclined plane up which the mold cars travel in close-up relation.

Referring to Fig. 6, the installation in its entirety is shown as comprising a tunnel type dryer A having an articulated conveyor B consisting of a plurality of individual cars operating therein to transport molds in prearranged lines of production through the dryer, a stripping station C and a fabricating station D. The fabricating station is preferably located external of the dryer although it may be hooded and operated as an extension of the dryer and in either event, a plurality of automatic fabricating machines are arranged on each side of the conveyor and in close adjacency thereto, the molds being automatically transferred between the machines and conveyor by means hereinafter described. The fabricating machines, conveyor and automatic mold transfer apparatus are all operated in synchronism through a main drive system powered by motor E, however, the cars proceed by gravity through the main portion of the dryer which is preferably disposed below the normal floor level and follows a tortuous path except at the fabricating and stripping stations, to conserve space. A drying atmosphere of controlled temperature, humidity and velocity is maintained in the dryer preferably according to the teachings of my co-pending application for United States Letters Patent, Serial No. 343,693.

The molds are arranged in side by side relation in longitudinal rows on the tiered shelves 2 of cars 3, the molds in any one row being of the same or different form than the molds in any other row, according to the production setup for any one particular run. Thus, extending entirely around the conveyor, the molds fall into lines of production or rows which are spaced laterally the normal width of the car and vertically according to the altitude of the shelves.

The cars are progressed along track 4 in the zone of the fabricating station D, Fig. 7, in endwise abutting relation and up an incline 5 of appreciable length adjacent fabricating machines 6, 7, 8 and 9, Figs. 2 and 6. The cars are moved at a constant speed by gear 10 located centrally of the track 4 and near the lower end of the incline which co-operates with racks 11 secured to the under side of each car and extending longitudinally thereof and establishing, when the cars are in abutting relation, a continuous gear track. The speed at which the cars are travelled on this zone is independently controllable through a variable speed transmission 13, Fig. 1, driven off the main drive shaft 14 and operating the gear shaft 13a through a chain 16 and sprockets 17.

The cars progress steadily past the fabricating machines at a constant speed and according to the disclosure of Fig. 1, molds are removed intermittently from all lines of production for filling and filled molds replaced in their respective lines; machines 7 and 9, Fig. 6, being located in the first position operate preferably on the lines of molds carried on the top tier of shelves and the machines 6 and 8 located in the second position operate on molds carried by the lower tiers of shelves. However if additional machines were to be operated, the number of tiers of shelves could be increased by the required number and two machines operated in third position, etc. Associated with each machine is an automatic mold pickup and transfer apparatus 18 which operates in timed relation with the particular machines with which it is associated. As shown, there are four of these devices and taking, for example, the transfer associated with machine 7, the construction and operation is as follows: co-operating pairs of jaws 20 and 20a faced with resilient material 21 and located at each end of a cross bar 22 are lowered in the position shown in Fig. 1 of an empty mold F on the conveyor and a filled mold G located in the end seat 46 of a mold transfer 19 on the machine. The jaws are closed on the brims of the molds by crank disc 24, Fig. 3, and rod 25 which rocks bellcrank 26 pulling rod 27 downwardly and oscillating interconnected bellcrank 28 and lever 28a on shafts 29. This closes the jaws which are mounted on pivots 20d and connected to the bellcrank 28 and lever 28a by straps 20e. The shafts 29 have duplicate crank and lever means attached to the opposite ends thereof and operating the corresponding set of jaws 20a and 20 in unison therewith.

When the jaws are closed on the molds, the rod 25 which is connected to the bellcrank 20 by swivel joints 31 continues its stroke, thus unseating the rollers 30, Fig. 4, located in depressions 30a in track 30b and elevating the center post 23 on which the cross arm 22 is mounted, thus lifting the molds gripped in the jaws off their respective seats. As the crank completes its stroke, the post is rotated a quarter turn which centers the empty mold over a conveyor 19a and the filled mold G over the top shelf on one of the mold cars. As the rollers 30 fall into the depressions 30c, the post 23 is lowered thus lowering the molds onto their respective seats. The rotation of the crank disc 24 past center opens the jaws releasing the molds and bringing the abutting faces of the bellcrank 28 and lever 28a into contact whereupon the post is elevated, returned to initial position and lowered, the fabricating machine having completed one cycle in the meantime and the conveyor having advanced a predetermined distance so that the next succeeding empty mold F and filled mold G are in position for pickup and transfer as just described.

The crank disc 24 is keyed to the main drive shaft 32 of the automatic machine, Fig. 2, to synchronize the speed of operation of the said transfer with that of the machine. Maximum production in all lines can be obtained only by operating each machine at the optimum speed for the particular size and shape of ware being made in any one line as limited, of course, by the speed of the conveyor which determines the rate of presentation and removal of molds at the various transfer points. Thus, more molds may occur in one line depending on the outside diameter and spacing of the mold than in another line and by making each machine independently controllable as to machine cycles for a predetermined linear travel of the conveyor past the fabricating station a maximum number of molds can be transferred and pieces of ware produced in each line without varying the conveyor speed.

The empty molds deposited on input conveyor 19a, Fig. 1, move intermittently toward a transfer 34 which receives and advances one mold each machine cycle to centered position over chuck 35 which elevates the mold into feeding position below feeder 36. Charges of clay are intermittently segregated by cutter 37 and deposited in or on the mold according to whether the machine is manufacturing hollowware or flat ware and after charging the mold is lowered onto the end seat 38 of the reciprocable transfer 19 operated by shifter levers 40 and track cam 41 keyed on the main drive shaft 32 of the machine, Fig. 2. The charged mold is advanced to centered position over chuck 42 and raised into co-operation with a die 43 which spreads the clay and bonds it to the mold, the normal adhering relation between the die and clay being overcome by the use of heat or a gaseous fluid whereupon the mold is lowered onto the center seat of transfer 19 advanced to chuck 44, elevated and rotated under profile 45, thus completing the piece. The mold is then deposited in the end seat 46 of transfer 19 which has been previously retracted and is then moved toward the conveyor into position for pick-up and transfer to the car by the jaws 20 and 20a mentioned. The fabricating machine just described while preferred represents only one type of fabricating apparatus that can be successfully operated with the present installation. A complete description of the fabricating machine is given in my co-pending applications Serial No. 5,795 and Serial No. 25,701. Other types of automatic fabricating apparatus may be employed having additional jiggering equipment or other equipment supplementing that of the jiggering for additional fabricating operations.

A base is provided for each machine which is stepped so that one machine of a longitudinally aligned pair may operate at a higher level than the other because of the variation in altitude of the production lines. All machines, however, are driven from a main drive shaft 14 which spans the mold conveyor and is located in a well in the base 47. An independent power takeoff is provided for each machine and is independently controllable through transmission gearing not shown. The numeral 48 illustrates a gear box located between each longitudinal pair of machines, Fig. 5, and connected to the main drive shaft. The telescoping stub shafts 49 and 49a each have sprockets 50 keyed thereto and individual chains 51 which connect with sprockets 51a driving a worm shaft 51b and a worm 52 meshing with gear 53 on the main drive shaft 32 of each machine.

As shown in Fig. 7, the cars move toward the left until the end car in the fabricating zone rides over the hump 56 and by gravity separates from the next succeeding car to the extent permitted by link 57 encompassing pins 54 on the abutting ends of the car bolsters 55, thereby permitting sufficient clearance between cars to negotiate the short radius curves in the drier. A friction drag of any conventional design can be applied to the cars in the loading zone lest the pull of the cars in the drier tend to prematurely ride the cars over the hump.

The molds must be presented at the point of transfer in definite spaced relation. By closing up the mold cars at the fabricating station, this spacing is preserved as between the end molds of any two abutting cars and since the molds are returned to the cars in exactly the same spacing, the possibility of setting a mold across the line of juncture of any two cars is definitely precluded.

The length of all car shelves is exactly the same. To determine the permissible number of molds which may be accommodated on any one shelf, the length of the shelf is divided by the diameter of the mold, thus if the shelf is 70 inches long and the molds 8 inches in diameter, 8 molds may be accommodated with a center to center spacing of 8¾ inches and the molds will be so placed that the end molds on two abutting shelves are exactly 8¾ inches center to center with the cars in abutting relation. The machine operating on this particular line of molds will be set to complete one machine cycle for each 8¾ inch advance of the shelf beyond the center line of the first mold removed from the shelf. If ware is being made in another line, for instance on 9 inch molds, the number of molds which may be accommodated on any one shelf will be seven with 10 inch center to center spacing. Thus, the machine and transfer operating on this line of molds will be adjusted to complete one cycle each and every 10 inches of travel of the conveyor shelf starting with the center of the first mold in line on a car.

Therefore, the speed of production of ware in any one line may vary over that in another line, for instance, more molds may be presented at the jigger per given interval in the smaller sizes than in the larger, however, the speed of conveyor travel would remain constant.

The installation is adaptable to either high or low form diversity. Pieces corresponding to those of a desired ware set may be made simultaneously which is particularly advantageous in producing both small or large orders of diversified shapes. A diversified production may result from variation in diameter or height, also contour or configuration of the molding surface of the molds and therefore such of the claims hereof as indicate a difference in production or molds shall be satisfied if the molds vary in any one of the respects mentioned.

Various changes in construction may occur to those familiar with the art, however, it is understood that the present invention is intended to encompass such modifications as fall within the spirit and scope of the invention.

What I claim is:

1. In apparatus for the manufacture of pottery ware, a conveyor for molds comprising a plurality of cars linked together for the directional travel thereof in spaced relation, a plurality of ware fabricating machines located adjacent the line of travel of said cars and means associated with said machines for automatically removing and replacing molds on said cars, each car having a plurality of mold supports arranged at different levels, diverse molds carried by said conveyor with corresponding molds carried by corresponding supports.

2. Apparatus for the manufacture of pottery ware comprising, in combination, a car-type conveyor for traveling molds arranged in a plurality of endless rows said molds in one row differing over those in at least one other row, a plurality of ware fabricating machines located adjacent the line of travel of said conveyor and means for automatically removing empty molds from said conveyor and replacing filled molds thereon said molds approaching and leaving said fabricating machines in the same lines.

3. Apparatus for the manufacture of pottery ware comprising, in combination, a plurality of cars, spaced shelves attached to said cars each shelf being adapted for the reception of a plurality of molds, diverse molds carried by said cars, a plurality of ware fabricating machines located adjacent said cars, means for automatically transferring molds from the shelves of said cars to said machines and means for travelling said cars in a predetermined path.

4. Apparatus for the manufacture of pottery ware comprising, in combination, a plurality of cars, vertically and laterally spaced shelves attached to said cars, diverse molds carried by said cars, each shelf being adapted for the reception of a plurality of molds, a plurality of ware fabricating machines located adjacent said cars, means for automatically transferring molds from the shelves of said cars to said machines and from said machines to said shelves and means for travelling said cars in a predetermined path.

5. Apparatus for the manufacture of pottery ware comprising, in combination, a plurality of connected mold cars, vertically and laterally spaced shelves attached to each car, means for travelling said cars in a predetermined endless path, a plurality of fabricating machines located adjacent the path of travel of said cars, means for transferring molds between said machines and the shelves of said cars and independently controllable drive means for each machine.

6. Apparatus for the manufacture of pottery ware comprising, in combination, a plurality of connected mold cars, vertically and laterally spaced shelves attached to each car, means for travelling said cars in a predetermined endless path, a plurality of ware fabricating machines located adjacent the path of travel of said cars, means for transferring molds between said machines and the shelves of said cars and independently controllable drive means for each of said machines and transfer associated therewith and said means for travelling cars.

7. An installation for the manufacture of pottery ware comprising, a dryer having a track therein, a plurality of ware fabricating machines located adjacent said track, a plurality of mold cars located on said track, means for moving said cars, a plurality of means for automatically transferring molds between said cars and said fabricating machines, mechanism for operating said fabricating machines and said transferring means, change speed mechanism for varying the speed of operation of said fabricating machines relative to the speed of the mold cars along said track, said cars traversing said track in endless cycles.

8. An installation for the manufacture of pottery ware comprising, a pottery ware dryer having a track therein, a plurality of ware fabricating machines located adjacent said track and in a portion that is inclined, drive means for moving said cars in abutting relation up said incline, means for transferring molds between said cars and said fabricating machines and means for operating said drive means, said mold transferring means and said fabricating machines in timed relation.

9. Apparatus for fabricating pottery ware comprising, in combination, a dryer, a track in said dryer, a plurality of interconnected mold cars located on said track, a plurality of ware fabricating machines located adjacent said track and in a portion that is inclined, means for moving said cars in abutting relation up said incline, said cars being separable upon leaving said incline and traversing the dryer in separated relation and drive means for said fabricating machines operating in timed relation with said means for moving said cars.

10. Apparatus for fabricating pottery ware comprising, in combination, a dryer for pottery ware, a plurality of mold cars adapted to traverse said dryer, each car having a multiple of shelves adapted to receive molds arranged in predetermined spaced relation, a plurality of ware fabricating machines located adjacent the path of travel of said cars, means for travelling said cars past said ware fabricating machines in close up relationship, the abutting shelves on said cars thereby forming a continuous shelf with the molds thereon in predetermined spaced relation, means for removing molds from and replacing molds on said shelves operating in timed relation with said fabricating machines, said mold cars traversing said dryer in separated relation and diverse molds carried by said cars.

11. Apparatus for the manufacture of pottery ware comprising, in combination, a plurality of mold cars having vertically and laterally spaced shelves adapted for the reception of molds in predetermined spaced relation and adapted to form a continuous line of equally spaced molds when moved into abutting relation, means enabling the abutment of said cars, drive means for travelling said cars when in abutting relation, a plurality of fabricating machines for fabricating ware on said molds, and means for transferring molds between said lines to said fabricating machines operating in timed relation with said drive means for travelling cars.

12. Apparatus for the manufacture of pottery ware comprising, in combination, a plurality of mold cars having vertically and laterally spaced shelves, molds on said shelves, a plurality of ware fabricating machines located adjacent said cars, means enabling the abutment of said cars in the zone of said fabricating machines, means for moving said cars when in abutting relation relative to said fabricating machines, means for removing empty molds from said car shelves, means for conveying said molds to and through the fabricating machines for filling and means for replacing filled molds on their respective shelves.

13. Apparatus for the manufacture of diversified pottery ware shapes on absorbent molds from plastic clay which comprises a conveyor comprising, a plurality of connected mold carriers having tiered shelves for the reception of molds, a plurality of fabricating machines located on opposite sides of said conveyor, a common drive means for all of said fabricating machines, independent control means for each fabricating machine, means for automatically transferring molds between said machines and said conveyor and means for driving said conveyor.

14. Apparatus for manufacturing diversified pottery ware shapes on absorbent molds from plastic clay comprising, in combination, a dryer having a conveyor operating at least in part therein, said conveyor including a plurality of interconnected mold supporting cars, individual mold supports arranged in tiers associated with said cars each support being adapted to receive a plurality of molds, drive means for said conveyor, a plurality of jiggering machines adjacent said conveyor, drive means for said jiggering machines, an oscillatable means for transferring empty molds from said conveyor to said fabricating machines and for transferring filled molds from said fabricating machines to said conveyor, drive means for said oscillatable transfer and means for operating said conveyor, said transfer and said fabricating machines in timed relation.

15. In apparatus for the manufacture of pottery ware of diversified shapes on absorbent molds, the combination which comprises, a dryer, a plurality of ware fabricating machines and a conveyor operating in said dryer and adjacent said fabricating machines, means for operating said fabricating machines in timed relation with the travel of said conveyor, means for automatically transferring the molds between said conveyor and said fabricating machines, said conveyor comprising a plurality of separable cars linked together for the directional travel thereof, said cars proceeding through said dryer by gravity and being positively driven in the zone of the fabricating machines.

16. In apparatus for the manufacture of pottery ware of diversified shapes on absorbent molds, the combination which comprises, a conveyor for molds comprising a plurality of cars each of said cars having tiered mold supports adapted to receive a plurality of molds, a plurality of fabricating machines located adjacent said conveyor, means for automatically transferring molds between said conveyor and said machines, said machines including means for automatically feeding clay to molds, means for applying the clay to molds and a jiggering means together with a mold transferring means and mechanism for imparting a step by step movement to said transferring means.

17. In apparatus of the class specified the combination which comprises, an automatic jiggering machine comprising means for automatically feeding clay to molds, press means and means for jiggering clay and a conveyor comprising a plurality of tiered mold cars operating in timed relation therewith and means for transferring molds between said machine and said conveyor, said conveyor being operated at a predetermined and constant speed without interruption in its travel.

18. In apparatus for the manufacture of pottery ware, a plurality of fabricating machines, means for automatically transferring molds to and from said machines, a conveyor comprising a plurality of tiered mold cars for travelling molds in definite predetermined spaced relation and arranged in lines adjacent said machine and without interruption in the continuous travel thereof, said mold transferring means removing and replacing molds in their respective lines at predetermined intervals at least one of said lines having molds spaced at different distances than the molds in other of said lines and containing a greater or lesser number of molds than in said other lines.

19. In combination, a mold conveyor comprising a plurality of individual cars having a common means for travelling the same in a predetermined path, a plurality of shelves associated with each car and arranged in the direction of the length thereof, diverse molds carried by said cars, a jiggering machine located adjacent said conveyor and means for transferring molds between said conveyor and said jiggering machine.

20. An installation for making diverse pottery shapes which comprises, a conveyor having molds arranged in lines thereon, at least one line of molds being for the production of ware of a different character than the molds in another line, a plurality of jiggering machines arranged adjacent said conveyor, each machine being associated with a line of molds and having fabricating instrumentalities corresponding to the type of ware being made in the particular line with which said machine is associated, mechanism for removing molds from their respective lines for the purpose of the fabrication of ware thereon by said fabricating machines, mechanism for restoring said molds when filled to their respective lines, a dryer arranged adjacent said conveyor and adapted to enclose at least a portion of said conveyor to dry the previously fabricated ware and a station disposed adjacent said conveyor where the ware is stripped from the molds.

21. In apparatus for manufacturing pottery-ware, an endless mold conveyor having diverse molds thereon arranged in endless rows, the number of molds contained in at least one row being of greater or lesser number than in other rows by virtue of the size of the molds, a plurality of fabricating machines arranged adjacent said conveyor, means for transferring molds between said fabricating machines and conveyor, the speed of operation of any one fabricating machine and transfer means being determined by the speed of presentation of molds at the transfer position in the line with which said machine is associated, and means for individually varying the speed of operation of the fabricating machines relative to the speed of travel of the conveyor.

WILLIAM J. MILLER.